US008649561B2

(12) United States Patent
Kintou et al.

(10) Patent No.: US 8,649,561 B2
(45) Date of Patent: Feb. 11, 2014

(54) SUBJECT DESIGNATING DEVICE AND SUBJECT TRACKING APPARATUS

(75) Inventors: Hiroshi Kintou, Kawasaki (JP); Ryuichi Ohmiya, Misato (JP)

(73) Assignee: Nikon Corporation, Tokyo (JP)

( * ) Notice: Subject to any disclaimer, the term of this patent is extended or adjusted under 35 U.S.C. 154(b) by 159 days.

(21) Appl. No.: 13/400,996

(22) Filed: Feb. 21, 2012

(65) Prior Publication Data
US 2012/0213406 A1     Aug. 23, 2012

(30) Foreign Application Priority Data

Feb. 21, 2011 (JP) ................................ 2011-034823

(51) Int. Cl.
*G06K 9/00* (2006.01)
(52) U.S. Cl.
USPC .......................................... 382/103; 382/282
(58) Field of Classification Search
None
See application file for complete search history.

(56) References Cited

U.S. PATENT DOCUMENTS

| 2009/0141937 | A1* | 6/2009 | Abe | 382/103 |
| 2010/0110238 | A1* | 5/2010 | Kang et al. | 348/242 |
| 2012/0148093 | A1* | 6/2012 | Sharma | 382/103 |

FOREIGN PATENT DOCUMENTS

JP   A-2004-205885   7/2004

OTHER PUBLICATIONS

Diedrick Marius, Sumita Pennathur, and Klint Rose, "Face Detection Using Color Thresholding, and Eigenimage Template Matching", May 2003, EE368, Digital Image Processing Project, Stanford University, Stanford, CA.*

* cited by examiner

*Primary Examiner* — Bhavesh Mehta
*Assistant Examiner* — Siamak Harandi
(74) *Attorney, Agent, or Firm* — Oliff & Berridge, PLC (57) ABSTRACT

A subject designating device includes: a representative value calculation unit that calculates a representative value for each image of a brightness image and chrominance images based upon pixel values indicated at pixels present within a first subject area; a second image generation unit that creates a differential image by subtracting the representative value from pixel values indicated at pixels present within a second subject area; a binarizing unit that binarizes the differential image; a synthesizing unit that creates a synthetic image by combining binary images in correspondence to the brightness image and the chrominance images; a mask extraction unit that extracts a mask constituted with a white pixel cluster from the synthetic image; an evaluation value calculation unit that calculates an evaluation value indicating a likelihood of the mask representing the subject; and a subject designating unit that designates the subject in the target image based upon the evaluation value.

16 Claims, 6 Drawing Sheets

SUBJECT DESIGNATING DEVICE AND SUBJECT TRACKING APPARATUS

INCORPORATION BY REFERENCE

The disclosure of the following priority application is herein incorporated by reference: Japanese Patent Application No. 2011-34823 filed Feb. 21, 2011.

BACKGROUND OF THE INVENTION

1. Field of the Invention

The present invention relates to a subject designating device and a subject tracking apparatus.

2. Description of Related Art

An imaging device in the related art determines a subject position based upon an AF area selected by the user and executes focus adjustment processing for the subject thus designated (see Japanese Laid Open Patent Publication No. 2004-205885).

SUMMARY OF THE INVENTION

The imaging device in the related art designates the subject position entirely based upon the AF area selected by the user without utilizing subject color information or brightness information for purposes of subject position determination. This means that a subject cannot be designated in certain photographic scenes.

According to the 1st aspect of the present invention, a subject designating device comprises: a first image generation unit that generates a brightness image expressed based upon a brightness component of a target image and chrominance images expressed based upon chrominance components of the target image; a representative value calculation unit that calculates a representative value for each image of the brightness image and the chrominance images having been generated by the first image generation unit, based upon pixel values indicated at pixels present within a first subject area containing a subject in the each image of the brightness image and the chrominance images; a second image generation unit that creates a differential image each in correspondence to the each image of the brightness image and the chrominance images having been generated by the first image generation unit, by subtracting the representative value calculated by the representative value calculation unit from pixel values indicated at pixels present within a second subject area containing the subject in the each image of the brightness image and the chrominance images; a binarizing unit that binarizes the differential image having been generated by the second image generation unit; a synthesizing unit that creates a synthetic image by combining a binary image created by the binarizing unit in correspondence to the brightness image and binary images created by the binarizing unit in correspondence to the chrominance images; a mask extraction unit that extracts a mask constituted with a white pixel cluster from the synthetic image generated by the synthesizing unit; an evaluation value calculation unit that calculates an evaluation value indicating a likelihood of the mask, having been extracted by the mask extraction unit, representing the subject; and a subject designating unit that designates the subject in the target image based upon the evaluation value having been calculated by the evaluation value calculation unit.

According to the 2nd aspect of the present invention, in the subject designating device according to the 1st aspect, it is preferred that the subject designating device further comprises: a third image generation unit that weights each pixel value indicated at each pixel present in the differential image generated by the second image generation unit by multiplying the each pixel value by a coefficient determined in correspondence to a distance from a third subject area containing the subject in the differential image to the each pixel present in the differential image so as to generate a weighted differential image in correspondence to the each image of the brightness image and the chrominance images. The binarizing unit binarizes the weighted differential image having been generated by the third image generation unit.

According to the 3rd aspect of the present invention, in the subject designating device according to the 1st aspect, it is preferred that the representative value is any one of; an average value, a most frequent value and a median of the pixel values indicated at the pixels present within the second subject area.

According to the 4th aspect of the present invention, in the subject designating device according to the 2nd aspect, it is preferred that the representative value is any one of; an average value, a most frequent value and a median of the pixel values indicated at the pixels present within the second subject area.

According to the 5th aspect of the present invention, in the subject designating device according to the 1st aspect, it is preferred that the second subject area is any one of an area containing a coordinate point on the target image indicated by a user and an area containing an AF point for focus adjustment processing.

According to the 6th aspect of the present invention, in the subject designating device according to the 2nd aspect, it is preferred that the second subject area is any one of an area containing a coordinate point on the target image indicated by a user and an area containing an AF point for focus adjustment processing.

According to the 7th aspect of the present invention, in the subject designating device according to the 3rd aspect, it is preferred that the second subject area is any one of an area containing a coordinate point on the target image indicated by a user and an area containing an AF point for focus adjustment processing.

According to the 8th aspect of the present invention, in the subject designating device according to the 4th aspect, it is preferred that the second subject area is any one of an area containing a coordinate point on the target image indicated by a user and an area containing an AF point for focus adjustment processing.

According to the 9th aspect of the present invention, a subject tracking apparatus comprises: a subject designating device according to the 1st aspect; and a tracking unit that tracks the subject designated by the subject designating unit from one frame to the next through a plurality of frames.

According to the 10th aspect of the present invention, a subject tracking apparatus comprises: a subject designating device according to the 2nd aspect; and a tracking unit that tracks the subject designated by the subject designating unit from one frame to the next through a plurality of frames.

According to the 11th aspect of the present invention, a subject tracking apparatus comprises: a subject designating device according to the 3rd aspect; and a tracking unit that tracks the subject designated by the subject designating unit from one frame to the next through a plurality of frames.

According to the 12th aspect of the present invention, a subject tracking apparatus comprises: a subject designating device according to the 4th aspect; and a tracking unit that tracks the subject designated by the subject designating unit from one frame to the next through a plurality of frames.

According to the 13th aspect of the present invention, a subject tracking apparatus comprises: a subject designating device according to the 5th aspect; and a tracking unit that tracks the subject designated by the subject designating unit from one frame to the next through a plurality of frames.

According to the 14th aspect of the present invention, a subject tracking apparatus comprises: a subject designating device according to the 6th aspect; and a tracking unit that tracks the subject designated by the subject designating unit from one frame to the next through a plurality of frames.

According to the 15th aspect of the present invention, a subject tracking apparatus comprises: a subject designating device according to the 7th aspect; and a tracking unit that tracks the subject designated by the subject designating unit from one frame to the next through a plurality of frames.

According to the 16th aspect of the present invention, a subject tracking apparatus comprises: a subject designating device according to the 8th aspect; and a tracking unit that tracks the subject designated by the subject designating unit from one frame to the next through a plurality of frames.

DESCRIPTION OF PREFERRED EMBODIMENTS

Figure 1:
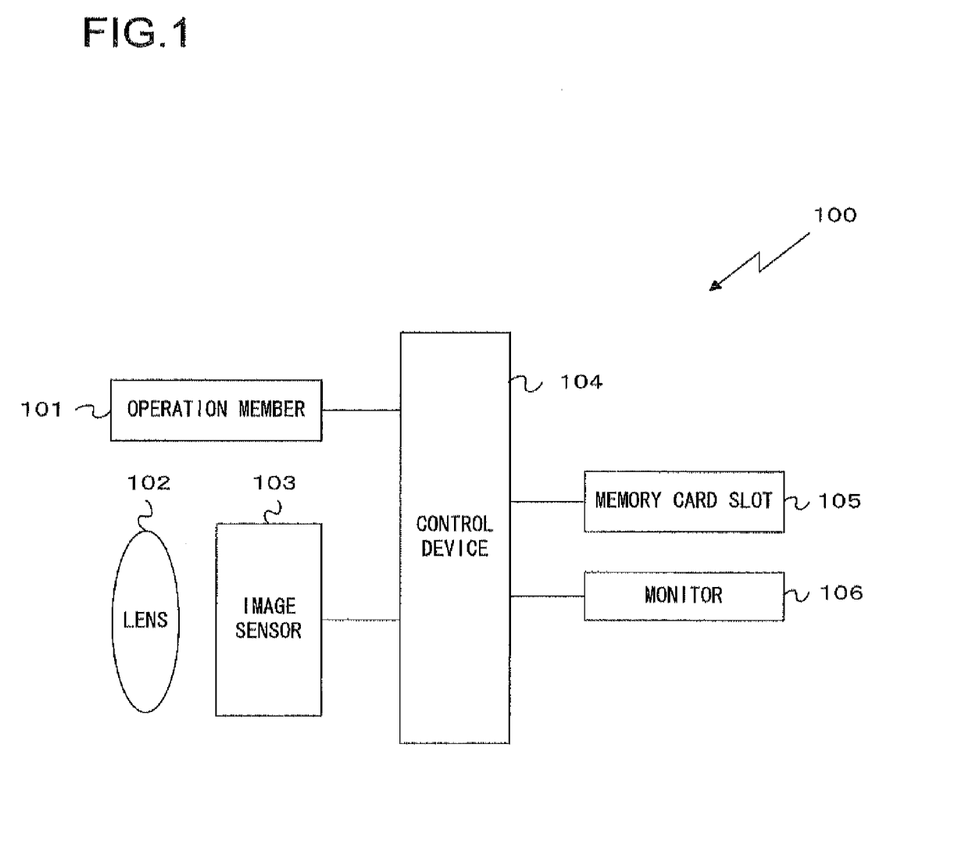
FIG. 1 is a block diagram showing the structure of a camera achieved in an embodiment.

FIG. 1 is a block diagram showing the structure of the camera achieved in an embodiment of the present invention. A camera 100 includes an operation member 101, a lens 102, an image sensor 103, a control device 104, a memory card slot 105 and a monitor 106. The operation member 101 includes various input members operated by the user, such as a power button, a shutter release button, a zoom button, a cross key, a confirm button, a review button and a delete button.

While the lens 102 is constituted with a plurality of optical lenses, FIG. 1 simply shows a single representative lens. The image sensor 103, which may be a CCD image sensor or a CMOS image sensor, captures a subject image formed through the lens 102. The image sensor 103 outputs image signals obtained by capturing the image to the control device 104.

The control device 104, constituted with a CPU, a memory and other peripheral circuits, controls the camera 100. It is to be noted that the memory constituting part of the control device 104 includes an SDRAM and a flash memory. The SDRAM, which is a volatile memory, is used as a work memory where a program executed by the CPU is opened and as a buffer memory where data are temporarily recorded by the CPU. In the flash memory, which is a non-volatile memory, program data related to the program executed by the control device 104, various parameters that are read for program execution and the like are recorded.

The control device 104 generates image data in a predetermined image format such as the MEG format (hereafter referred to as "main image data") based upon the image signals input thereto from the image sensor 103. In addition, the control device 104 generates display image data, e.g., thumbnail image data, based upon the image data having been generated. The control device 104 creates an image file that contains the main image data and the thumbnail image data having been generated and is appended with header information. The image file thus created is output to the memory card slot 105. The embodiment is described by assuming that the main image data and the thumbnail image data are both image data expressed in the RGB colorimetric system.

At the memory card slot 105, in which a memory card, used as a storage medium, is inserted, an image file output from the control device 104 is recorded as the image file is written into the memory card. In addition, in response to an instruction issue from the control device 104, an image file stored in the memory card is read at the memory card slot 105.

At the monitor 106, which is a liquid crystal monitor (back side monitor) installed at the rear surface of the camera 100, an image stored in the memory card, a setting menu enabling selection of settings for the camera 100 and the like are displayed. In addition, as the user sets the camera 100 in a photographing mode, the control device 104 outputs to the monitor 106 display image data corresponding to images obtained from the image sensor 103 in time series. As a result, a live-view image corresponding to the display image data is displayed at the monitor 106.

Figure 2A:
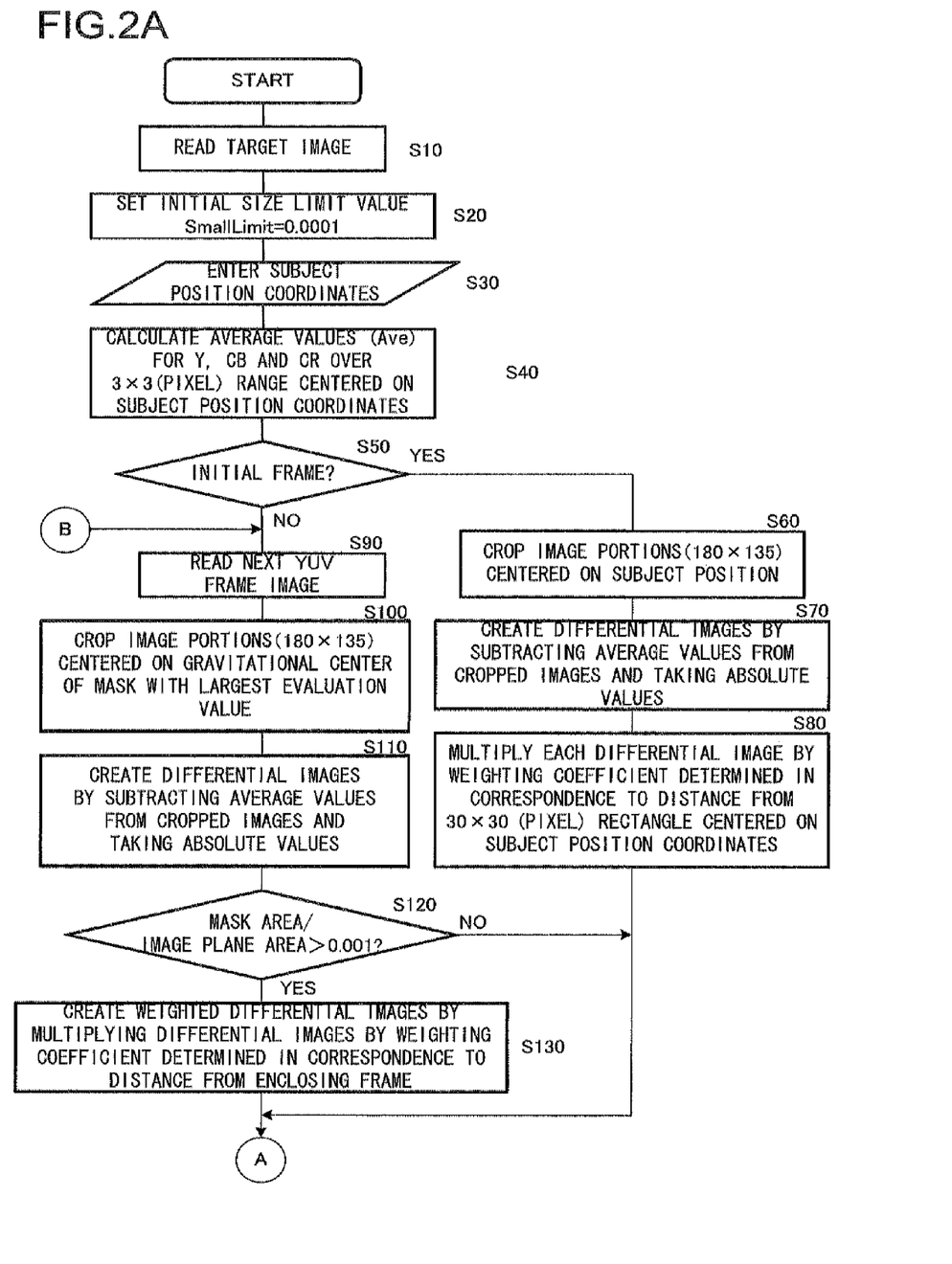
FIGS. 2A and 2B present a flowchart of subject tracking processing.
Figure 2B:
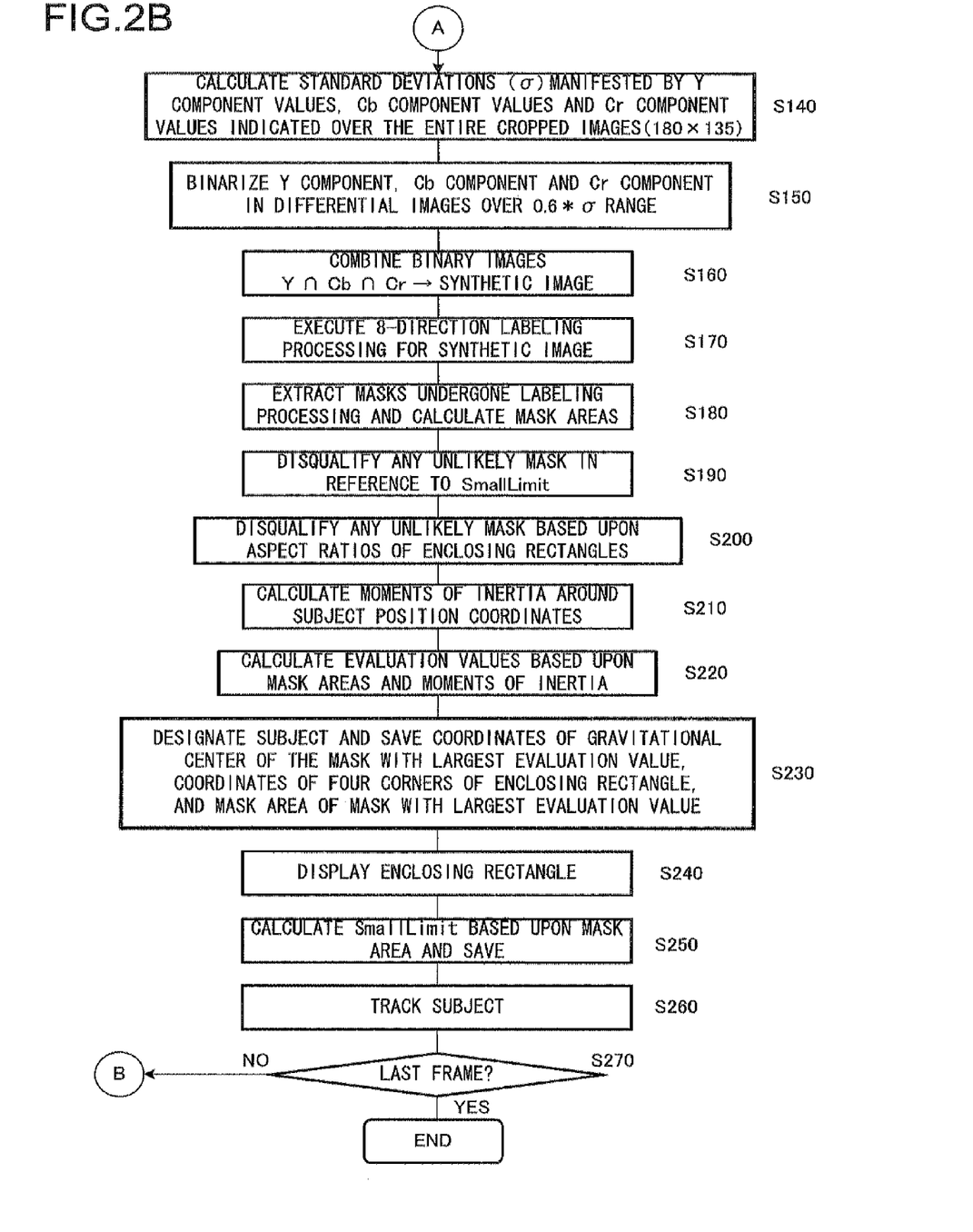

The control device 104 in the embodiment designates an object within the photographic image plane as a subject based upon initial subject positions in the photographic image plane, subject color information and subject brightness information, and tracks the designated subject. FIGS. 2A and 2B present a flowchart of the subject tracking processing executed in the embodiment. The processing shown in FIGS. 2A and 2B is executed by the control device 104 as a program started up as an image data input from the image sensor 103 starts in response to a subject tracking start instruction issued by the user.

In step S10, the control device 104 reads an image input from the image sensor 103 as a target image. At this time, the control device 104 reduces the size of the image input from the image sensor 103 to, for instance, a 360×240 (pixel) size and designates the reduced image as the target image. This allows the subsequent processing to be executed quickly. As explained earlier, the image data input from the image sensor 103 are expressed in the RGB colorimetric system in the embodiment. Accordingly, RGB image data are converted to a brightness image expressed based upon a brightness component (Y component) and chrominance images expressed based upon chrominance components (Cb component and Cr component) in a YCbCr color space, as expressed in (1) through (3) below or (4) through (6) below. It is to be noted that this conversion processing does not need to be executed if the image data input from the image sensor 103 are already expressed in the YCbCr colorimetric system.

$$Y = 0.2990R + 0.5870G + 0.1140B \tag{1}$$

$$Cb = -0.1687R - 0.3313G + 0.5000B + 128 \tag{2}$$

$$Cr = 0.5000R - 0.4187G - 0.0813B + 128 \tag{3}$$

$$Y = 0.25R + 0.50G + 0.25B \tag{4}$$

$$Cb = -0.25R - 0.50G + 0.75B + 128 \tag{5}$$

$$Cr = 0.75R - 0.50G - 0.25B + 128 \tag{6}$$

Once the processing in step S10 is executed, the operation proceeds to step S20, in which the control device 104 sets a limit value SmallLimit in order to ensure that no superfluous processing is executed and to prevent noise. SmallLimit may be set to, for instance, 0.0001 in the embodiment. SmallLimit is used in the processing executed in step S190 as will be described later. After executing step S20, the operation proceeds to step S30.

In step S30, the control device 104 determines subject position coordinates within the target image. In the embodiment, the control device 104 prompts the user to indicate a specific subject position in the target image and sets the coordinates of the position entered by the user via the operation member 101 as the subject position coordinates.

Following step S30, the operation proceeds to step S40, in which the control device 104 calculates average values for the Y component, the Cb component and the Cr component over a 3×3 (pixel) area centered on the subject position coordinates having been set in step S30. In the following description, the Y component average value, the Cb component average value and the Cr component average value will be respectively notated as aveY, aveCb and aveCr. Once the processing in step S40 is executed, the operation proceeds to step S50.

In step S50, the control device 104 makes a decision as to whether or not the target image is a first frame constituting the live view image, i.e., whether or not the target image is the image in the initial frame. If an affirmative decision is made in step S50, the operation proceeds to step S60. In step S60, the control device 104 crops image portions each ranging over a predetermined range, e.g., a 180×135 (pixel) range centered on the subject position coordinates having been set in step S30, from the 360×240 (pixel) brightness image (Y image) and chrominance images (Cb image and Cr image) having been created in step S10. The subsequent processing executed for the three cropped images obtained through this crop processing can be expedited.

Following step S60, the operation proceeds to step S70, in which the control device 104 individually subtracts the Y component average value, the Cb component average value and the Cr component average value having been calculated in step S40, each from the pixel values indicated in the corresponding cropped image among the three cropped images having been created in step S60, and creates three differential images based upon the absolute values of the differences thus calculated. Differential image components DiffY, DiffCb and DiffCr of the differential images each corresponding to one of the cropped images are expressed as in (7) through (9) below. The function abs(k) in expressions (7) through (9) represents the absolute value RI of the difference k. As an alternative, differential images may be created by taking the square $k^2$ of the difference k, instead of the absolute value |k| of the difference k.

$$\text{Diff}Y=\text{abs}(Y-\text{ave}Y) \quad (7)$$

$$\text{Diff}Cb=\text{abs}(Cb-\text{ave}Cb) \quad (8)$$

$$\text{Diff}Cr=\text{abs}(Cr-\text{ave}Cr) \quad (9)$$

Once the processing in step S70 is executed, the operation proceeds to step S80, in which the control device 104 calculates a distance weighting coefficient Dist, which corresponds to the distance from a subject area assuming a predetermined areal size centered on the subject position coordinates set in step S30, e.g., a 30×30 (pixel) rectangular area, to each pixel position, in each of the three images, i.e., the brightness image and the two chrominance images. An example of distance weighting coefficient Dist calculation will be described later. The control device 104 then creates distance-weighted differential images DistY, DistCb and DistCr by individually multiplying the pixel values indicated in the differential images expressed with the Y component, the Cb component and the Cr component created in step S70 by the distance weighting coefficient Dist, as expressed in (10) through (12) below. After executing step S80, the operation proceeds to step S140 which will be explained later. Through the processing executed in step S80, in order to allow image values in binary images to be obtained through binarization, as described later, to readily assume the value of 0, background noise can be eliminated.

$$\text{Dist}Y=\text{Diff}Y\times\text{Dist} \quad (10)$$

$$\text{Dist}Cb=\text{Diff}Cb\times\text{Dist} \quad (11)$$

$$\text{Dist}Cr=\text{Diff}Cr\times\text{Dist} \quad (12)$$

Figure 3:
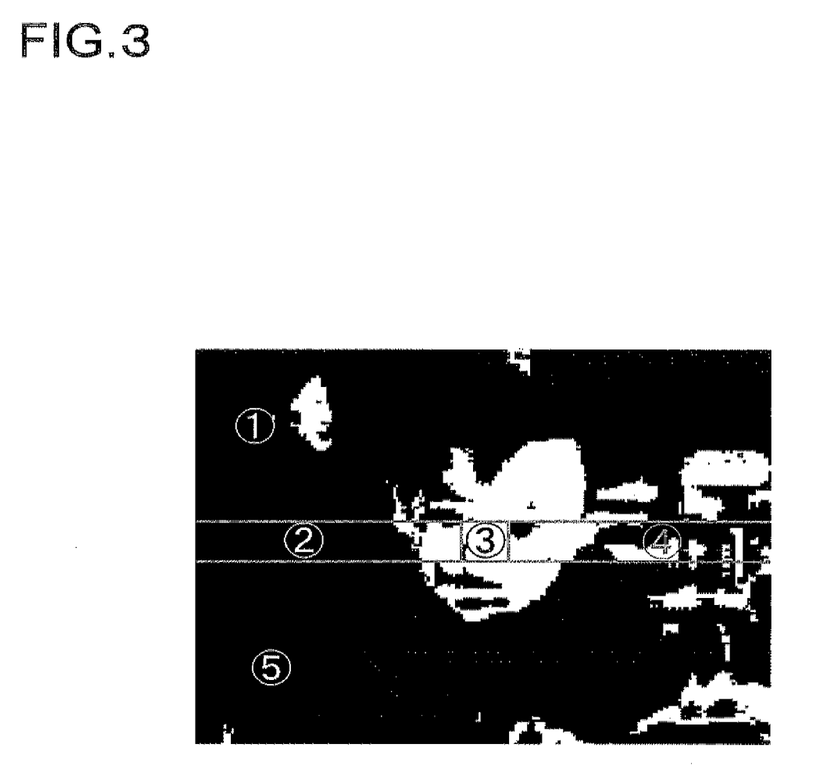
FIG. 3 shows how the distance weighting coefficient Dist may be calculated in a first example.

In reference to FIG. 3, an example of distance weighting coefficient Dist calculation is described. In the example presented in FIG. 3, an area 3 has been designated by the control device 104 as the 30×30 (pixel) rectangular subject area centered on the subject position coordinates. A variable Xsize indicating the size of the rectangle measured along an x direction, and a variable Ysize indicating the size of the rectangle measured along a y direction, are defined as in (13) below. A variable γ used when calculating the distance weighting coefficient Dist is defined as in (14) below.

$$X\text{size}=30, Y\text{size}=30 \quad (13)$$

$$\gamma=10\times((X\text{size}/2)^2+(Y\text{size}/2)^2) \quad (14)$$

In the example presented in FIG. 3, the distance weighting coefficient Dist is calculated as expressed in (15) below for a pixel present above the area 3, e.g., a pixel present in an area 1. The distance weighting coefficient Dist is calculated as expressed in (16) below for a pixel present at a lateral position matching that of the area 3 and present to the left of the area 3, e.g., a pixel present in an area 2. The distance weighting coefficient Dist is calculated as expressed in (17) below for a pixel present in the area 3. The distance weighting coefficient Dist is calculated as expressed in (18) below for a pixel present at a lateral position matching that of the area 3 and present to the right of the area 3, e.g., a pixel present in an area 4. The distance weighting coefficient Dist is calculated as expressed in (19) below for a pixel present below the area 3, e.g., a pixel present in an area 5.

$$\text{Dist}=1+((y-y \text{ coordinate of rectangle upper end})^2+ (x-x \text{ coordinate of subject position})^2)/\gamma \quad (15)$$

$$\text{Dist}=1+((y-y \text{ coordinate of subject position})^2+(x-x \text{ coordinate of rectangle left end})^2)/\gamma \quad (16)$$

$$\text{Dist}=1 \quad (17)$$

$$\text{Dist}=1+((y-y \text{ coordinate of subject position})^2+(x-x \text{ coordinate of rectangle right end})^2)/\gamma \quad (18)$$

$$\text{Dist}=1+((y-y \text{ coordinate of rectangle lower end})^2+ (x-x \text{ coordinate of subject position})^2)/\gamma \quad (19)$$

If a negative decision is made in step S50, the operation proceeds to step S90. In step S90, the control device 104 executes processing similar to that executed in step S10 for the image newly input from the control device 104 so as to create a brightness image (Y image) and two chrominance images (Cb image and Cr image), the data size of which is reduced to 360×240 (pixel). The operation then proceeds to step S100.

In step S100, in the preceding frame, the control device 104 crops image portions each ranging over a predetermined range, e.g., a 180×135 (pixel) range, centered on the coordinates of the gravitational center of a mask with the largest evaluation value, having been saved in step S230 as will be explained later, respectively from the 360×240 (pixel) brightness image and chrominance images having been created in step S90. The subsequent processing executed for the three cropped images obtained through this crop processing is thus expedited. The term "mask" used in the description of the embodiment refers to a white pixel cluster in a binary image. The mask achieving the largest evaluation value will be described in detail later.

Once the processing in step S100 is executed, the operation proceeds to step S110, in which the control device 104 creates differential images by calculating the differential image components DiffY, DiffCb and DiffCr of the differential images as expressed in (7) through (9) in much the same way as it creates the differential images in step S70 as described earlier, each in correspondence to one of the three cropped images having been created in step S100. The operation then proceeds to step S120.

In step S120, the control device 104 calculates a mask area of the mask in the preceding frame based upon the coordinates of the four corners of the enclosing rectangular subject area enclosing the mask having been saved in step S230 as will be explained later or obtains the mask area of the mask in the preceding frame having been saved in step S230 as will be explained later, and makes a decision as to whether or not the mask area of the mask and the entire image plane area of the entire photographic image plane achieve a relationship expressed in (20) below.

$$\text{mask area/entire image plane area} > 0.001 \quad (20)$$

If an affirmative decision is made in step S120, the operation proceeds to step S130, in which the control device 104 determines the enclosing rectangle position in each differential image based upon the coordinates of the four corners of the enclosing rectangular subject area in the preceding frame having been saved in step S230, as will be explained later, and calculates the distance weighting coefficient Dist in correspondence to the distance between the enclosing rectangle and each pixel position. The control device 104 then creates distance-weighted differential images DistY, DistCb and DistCr by individually multiplying the pixel values indicated in the differential images expressed with the Y component, the Cb component and the Cr component having been created in step S110, by the distance weighting coefficient Dist, as expressed in (10) through (12). Following step S130, the operation proceeds to step S140.

Figure 4:
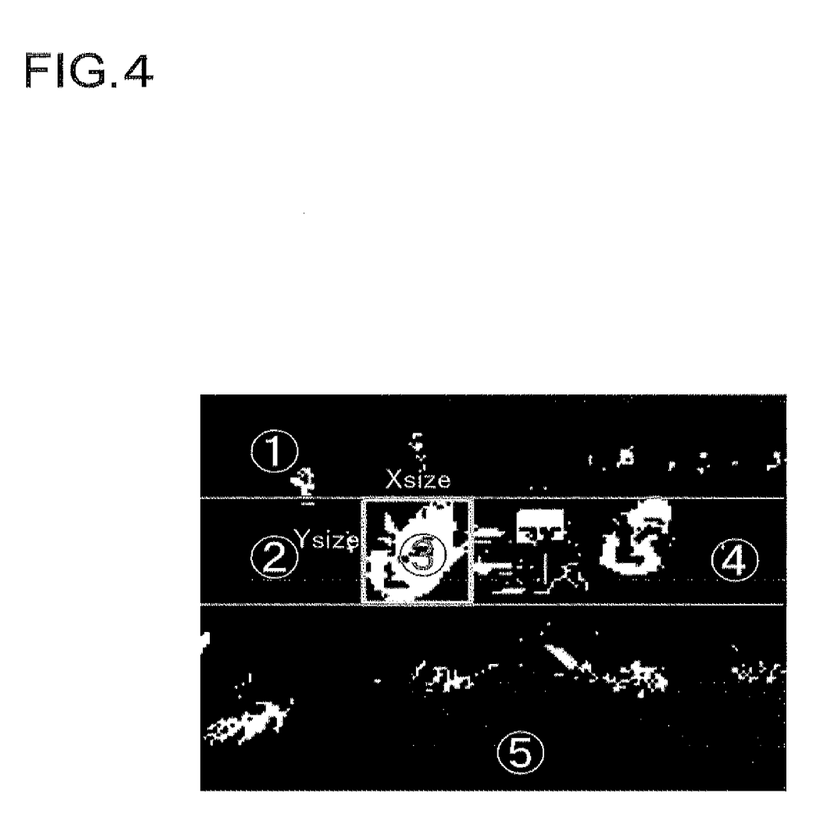
FIG. 4 shows how the distance weighting coefficient Dist may be calculated in a second example.

The distance weighting coefficient Dist can be calculated in correspondence to the distance from the enclosing rectangle by adopting a calculation method similar to that described in reference to step 80. For instance, in conjunction with the enclosing rectangle assuming Xsize along the x direction and Ysize along the y direction, the variable γ used when calculating the distance weighting coefficient Dist may be defined as in (14). For the area 3 in FIG. 4 designated as the enclosing rectangular subject area, the distance weighting coefficient Dist is calculated as expressed in (15) for a pixel present above the area 3, e.g., a pixel present in an area 1. The distance weighting coefficient Dist is calculated as expressed in (16) for a pixel present at a lateral position matching that of the area 3 and present to the left of the area 3, e.g., a pixel present in the area 2. The distance weighting coefficient Dist is calculated as expressed in (17) for a pixel present in the area 3. The distance weighting coefficient Dist is calculated as expressed in (18) for a pixel present at a lateral position matching that of the area 3 and present to the right of the area 3, e.g., a pixel present in the area 4. The distance weighting coefficient Dist is calculated as expressed in (19) for a pixel present below the area 3, e.g., a pixel present in an area 5.

If a negative decision is made in step S120, the operation proceeds to step S140. By executing the distance-based weighting processing in step S130 only upon making an affirmative decision in step S120 as described above, the risk of losing the subject can be lowered since no distance-based weighting processing is executed for a small object.

In step S140, the control device 104 calculates standard deviations manifested by the pixel values in the cropped images having been created in step S60 or step S100, i.e., a standard deviation sigY manifested in the Y component cropped image, a standard deviation sigCb manifested in the Cb-component cropped image and a standard deviation sigCr manifested in the Cr-component cropped image. In the embodiment, the standard deviations are calculated based upon the average values aveY, aveCb and aveCr having been calculated over the 3×3 (pixel) range in step S40, instead of the average values for the cropped images. Once the processing in step S140 is executed, the operation proceeds to step S150.

In step S150, the control device 104 binarizes the components DistY, DistCb and DistCr expressing the distance-weighted differential images having been created in step S80 or step S130, as explained below, and thus creates binary images expressed with the Y component, the Cb component and the Cr component. More specifically, the control device 104 creates a binary image by binarizing each DistY component value in the Y component distance-weighted differential image, as expressed in (21) below.

$$\text{if } \text{Dist}Y < \alpha \times \text{sig}Y \text{ then } \text{Dist}Y = 1 \text{ else } \text{Dist}Y = 0 \quad (21)$$

The control device 104 creates a binary image by binarizing each DistCb component value in the Cb component distance-weighted differential image, as expressed in (22) below.

$$\text{if } \text{Dist}Cb < \alpha \times \text{sig}Cb \text{ then } \text{Dist}Cb = 1 \text{ else } \text{Dist}Cb = 0 \quad (22)$$

However, if 118<aveCb<138 and sigCb<abs(aveCb−128)+3, the control device 104 creates a binary image by binarizing each DistCb component value as expressed in (23) below.

$$\text{if } \text{Dist}Cb < \alpha \times \text{sig}Cb \times [\{\text{abs}(\text{ave}Cb-128)+3\}/\text{sig}Cb]^{1/2} \times [10/\{\text{abs}(\text{ave}Cb-128)+0.1\}]^{1/2} \text{ then } \text{Dist}Cb=1$$
$$\text{else } \text{Dist}Cb=0 \quad (23)$$

The control device 104 creates a binary image by binarizing each DistCr component value in the Cr component distance-weighted differential image, as expressed in (24) below.

$$\text{if } \text{Dist}Cr < \alpha \times \text{sig}Cr \text{ then } \text{Dist}Cr = 1 \text{ else } \text{Dist}Cr = 0 \quad (24)$$

However, if 118<aveCr<138 and sigCr<abs(aveCr−128)+3, the control device 104 creates a binary image by binarizing each DistCr component value as expressed in (25) below.

$$\text{if } \text{Dist}Cr < \alpha \times \text{sig}Cr \times [\{\text{abs}(\text{ave}Cr-128)+3\}/\text{sig}Cr]^{1/2} \times [10/\{\text{abs}(\text{ave}Cr-128)+0.1\}]^{1/2} \text{ then } \text{Dist}Cr=1$$
$$\text{else } \text{Dist}Cr=0 \quad (25)$$

α in expressions (21) through (25) above may assume a value of, for instance, 0.6. When creating a binary image corresponding to the Cb component and a binary image corresponding to the Cr component, an achromatic subject will not be successfully extracted through standard binarization if the average value aveCb of the Cb component values is close to 128 (118<aveCb<138) and the standard deviation sigCb of the Cb component is small (sigCb<abs (aveCb−128)+3) and if the average value aveCr of the Cr component values is close to 128 (118<aveCr<138) and the standard deviation sigCr of the Cr component is small (sigCr<abs (aveCr−128)+3). Accordingly, in place of the standard binarization, alternative binarization is executed as expressed in (23) by using a weighting coefficient corresponding to the Cb component average value aveCb and the standard deviation sigCb and as expressed in (25) by using a weighting coefficient corresponding to the Cr component average value aveCr and the standard deviation sigCr.

Figure 5:
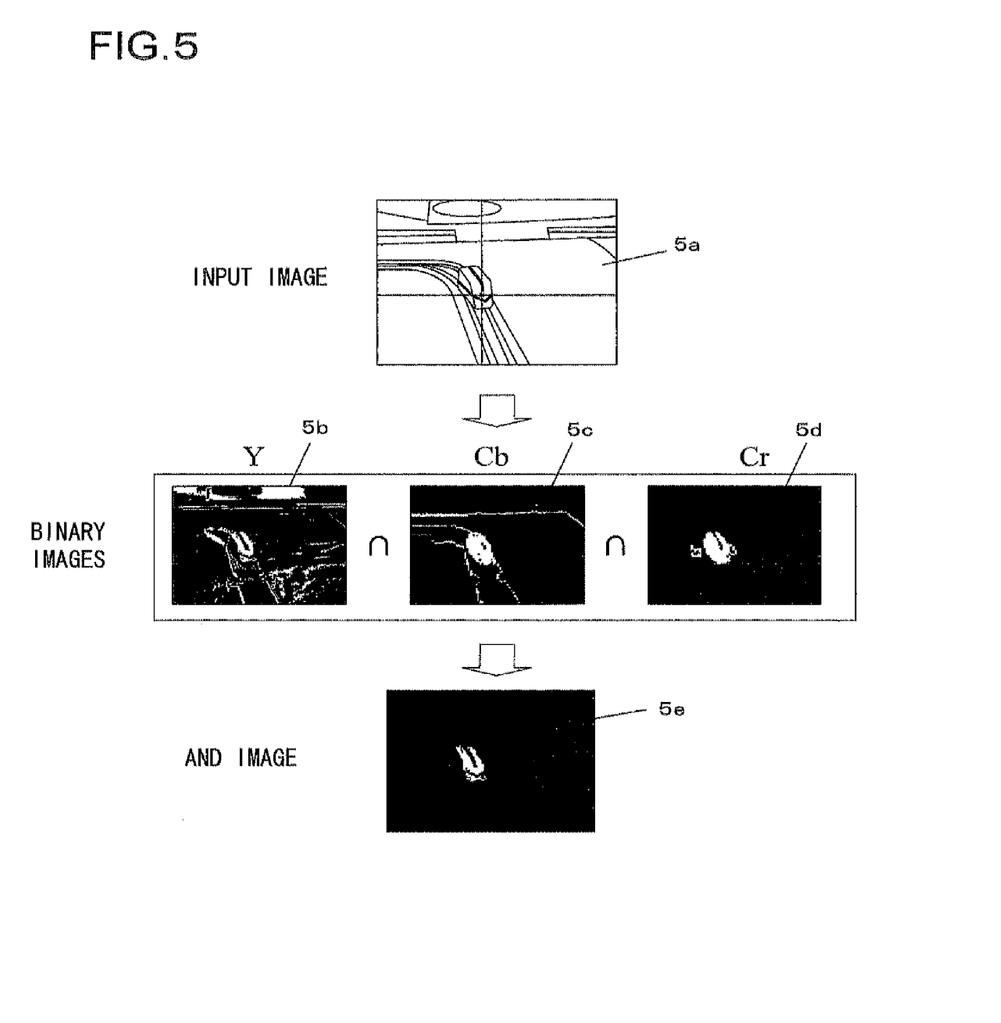
FIG. 5 shows how a synthetic image may be created, for example.

Once the processing in step S150 is executed, the operation proceeds to step S160, in which the control device 104 combines binarized Y, Cb and Cr images 5b through 5d, having been created based upon a target image 5a, through an AND operation as shown in FIG. 5, and thus creates an AND image (synthesized image) 5e. Based upon the AND image 5e thus created, the subject color can be identified. Following step S160, the operation proceeds to step S170.

In step S170, the control device 104 executes eight-direction labeling processing on the AND image 5e having been created in step S160. In this step, four-direction labeling processing instead of the eight-direction labeling processing may be executed. Following step S170, the processing proceeds to step S180, in which the control device 104 extracts masks constituted with white pixel clusters from the synthetic image having undergone the labeling processing in step S170 and calculates the mask areas of the extracted masks. Once the processing in step S180 ends, the operation proceeds to step S190.

In step S190, the control device 104 eliminates any mask that is not likely to represent a main subject based upon the map areas having been calculated in step S180. More specifically, the control device 104 compares values, each obtained by dividing a given mask area by the AND image plane area for the AND image, with a preset lower limit SmallLimit, and retains any mask with the corresponding quotient greater than SmallLimit but disqualifies any other mask as a subsequent processing target. For the first frame, the value set for SmallLimit in step S20 is used, but the value calculated for SmallLimit in step S250 for the preceding frame is used for the second and subsequent frames. Through these measures, faster processing speed is assured by disqualifying any mask not likely to represent a main subject, e.g., a mask that is either too small or too large, as a subsequent processing target.

$$\text{SmallLimit} < \text{mask area/entire image plane area} \quad (26)$$

Once the processing in step S190 is executed, the operation proceeds to step S200 in which the control device 104 sets enclosing rectangular subject areas that enclose the masks having been labeled in step S170 and eliminates any mask not likely to represent a main subject based upon the aspect ratios of the enclosing rectangles. More specifically, the control device 104 retains any mask satisfying the condition expressed in (27) below but disqualifies any other mask as a subsequent processing target. Through these measures, faster processing speed is assured by disqualifying any narrow mask not likely to represent a main subject as a subsequent processing target.

$$0.2 \leq \text{longitudinal measurement of enclosing rectangle/lateral measurement of enclosing rectangle} \leq 5 \quad (27)$$

Following step S200, the operation proceeds to step S210 in which the control device 104 calculates a moment of inertia IM22 for each mask as expressed in (28) below. Once the processing in step S210 is executed, the operation proceeds to step S220.

$$\text{IM22} = \Sigma\Sigma\{(x-x_g)^2 + (y-y_g)^2\} \quad (28)$$

(x, y) in expression (28) indicates the coordinates of each pixel in a given mask. $(x_g, y_g)$ indicates the coordinates of the subject position having been specified in step S30 if the target image is a first frame image, whereas it indicates the coordinates of the gravitational center of the mask with the largest evaluation value having been saved through the processing executed in step S230, as will be described later, for the preceding frame if the target image is a second or subsequent frame image.

In step S220, the control device 104 calculates an evaluation value for each mask as expressed in (29) below based upon the corresponding mask area having been calculated in step S180 and the moment of inertia IM22 having been calculated in step S210. β in expression (29) may take a value of, for instance, 1.5.

$$\text{evaluation value} = (\text{mask area})^\beta / \text{IM22} \quad (29)$$

Once the processing in step S220 is executed, the operation proceeds to step S230, in which the control device 104 designates a subject by selecting the mask with the largest evaluation value among the evaluation values having been calculated in step S220 as a mask most likely to represent the main subject. The control device 104 then saves the coordinates of the gravitational center of the mask with the largest evaluation value thus selected and the coordinates of the four corners of the enclosing rectangle enclosing the particular mask having been set in step S200. It also saves the mask area of the mask with the largest evaluation value having been designated. Following step S230, the operation proceeds to step S240.

In step S240, the control device 104 outputs to the monitor 106 an image plane with the rectangle enclosing the mask included in the image having been read in step S10 or step S90 based upon the coordinates of the gravitational center of the mask and the coordinates of the four corners of the enclosing rectangle, which have been saved in step S230. As a result, the enclosing rectangle indicating the subject position can be displayed over the live view image.

Following step S240, the operation proceeds to step S250 in which the control device 104 calculates the value for SmallLimit, to be used in step S190 for the next frame, based upon the areal size of the mask achieving the largest evaluation value among the evaluation values calculated in step S220 and saves the SmallLimit value thus calculated. SmallLimit may be calculated as expressed in (30) below.

$$\text{SmallLimit} = (\text{mask area/entire image plane area}) \times 0.1 \quad (30)$$

However, if the relationship expressed as; SmallLimit<InitSmallLimit×0.1 exists between the SmallLimit value and InitSmallLimit representing SmallLimit=0.0001 having been set in step S20, SmallLimit should be set equal to InitSmallLimit.

Following step S250, the operation proceeds to step S260, in which the control device 104 tracks the subject. However, tracking processing cannot be executed if there is only one frame and accordingly, the processing in step S260 is only executed for the image in the second frame or a subsequent frame. In step S270, the control device 104 makes a decision as to whether or not the image data input from the image sensor 103 has ended, i.e., whether or not the current frame is the last frame. If a negative decision is made in step S270, the operation returns to step S90 to repeatedly execute the processing. If, on the other hand, an affirmative decision is made in step S270, the processing ends. By repeatedly executing the processing up to step S270 as shown in FIGS. 2A and 2B, the subject can be designated in each of the plurality of frames input in time series and then tracked from one frame to the next through the plurality of frames in step S260.

The following advantages are achieved with the camera 100 in the embodiment described above.

(1) Based upon the target image, the control device 104 generates a brightness image expressed with the brightness component and chrominance images expressed with the chrominance components, determines the coordinates of a specific subject position in each image among the brightness image and the chrominance images thus generated, and calculates an average value for each component among the Y component, the Cb component and the Cr component over a 3×3 (pixels) range centered on the coordinates of the subject position. The control device 104 creates differential images each by subtracting the corresponding average value from the pixel values in a cropped image extracted from one of the images having been generated, i.e., the brightness image and the chrominance images, binarizes the differential images thus created and then generates a synthetic image by combining the binary images. The control device 104 then executes eight-direction or four-direction labeling processing on the synthetic image (AND image). The control device 104 extracts masks constituted with white pixel clusters from the synthetic image having undergone the processing and designates a subject in the target image based upon evaluation values calculated for one of the masks. As a result, the subject position can be designated by using subject color information (chrominance information) and brightness information in any of various photographic scenes.

(2) The control device 104 multiplies each pixel value indicated in a given differential image by a distance weighting coefficient Dist determined in correspondence to the distance from a rectangular area (subject area) assuming a predetermined size and centered on the subject position coordinates so as to weight the pixel value and generates weighted differential images each in correspondence to one of the images having been generated, i.e., the brightness image and the chrominance images. Since this allows the pixel value indicated at each pixel to be weighted in correspondence to the distance between the subject position and the position of the particular pixel, the subject position can be determined with better accuracy.

(3) The control device 104 prompts the user to indicate the subject position in the target image and sets the coordinates of the position entered by the user via the operation member 101 as the subject position coordinates. Through these measures, the subject position coordinates can be determined with a high level of accuracy.

(4) The control device 104 designates the subject in each of the plurality of frames input in time series. As a result, the subject can be tracked from one frame to the next through the plurality of frames.

—Variations—

The camera achieved in the embodiment as described above allows for the following variations.

(1) The control device 104 in the embodiment described above crops image portions over a predetermined range, e.g., a 180×135 (pixel) range individually from the brightness image and the chrominance images in step S60 or step S100 in FIG. 2. As an alternative, the processing in the subsequent steps may be executed for the brightness image and the chrominance images without cropping image portions from these images.

(2) In the embodiment described above, the control device 104 creates distance-weighted differential images DistY, DistCb and DistCr each by multiplying the pixel values indicated in one of the differential images expressed with the Y component, the Cb component and the Cr component by the distance weighting coefficient Dist in step S80 or step S130 in FIG. 2. However, it is not strictly necessary to execute the processing in step S80 or step S130 and the processing in step S140 and subsequent steps may be executed for the unweighted differential images.

(3) In the embodiment described above, the control device 104 prompts the user to indicate the subject position in the target image and sets the coordinates of the position entered by the user via the operation member 101 as the subject position coordinates. However, the subject position coordinates may be set through another method. For instance, the control device 104 may set the coordinates of the AF point for which focus adjustment has been executed through autofocus processing, as the subject position coordinates.

(4) The control device 104 in the embodiment described above calculates the average value in correspondence to each component among the Y component, the Cb component and the Cr component over the 3×3 (pixel) range centered on the subject position coordinates indicated by the user, as a representative value, and generates differential images each by subtracting the average value, i.e., the representative value, from the pixel values indicated in the corresponding cropped image. As an alternative, the control device 104 may generate each differential image by calculating a most frequent value or a median, instead of the average value, as a representative value and subtracting the representative value from the pixel values indicated in the cropped image.

(5) The subject designating device and the subject tracking apparatus according to the present invention are adopted in a camera in the embodiment described above. However, the present invention is not limited to this example and it may be adopted in a subject tracking apparatus that reads video data and tracks a subject in the video image from one frame to the next through a plurality of frames, such as a personal computer or a portable terminal.

As long as the features characterizing the present invention are not compromised, the present invention is not limited to any of the specific structural particulars described in reference to the embodiment. In addition, the embodiment described above may be adopted in combination with a plurality of variations.

The above described embodiment is an example and various modifications can be made without departing from the scope of the invention.

What is claimed is:

1. A subject designating device, comprising:
   a first image generation unit that generates a brightness image expressed based upon a brightness component of a target image and chrominance images expressed based upon chrominance components of the target image;
   a representative value calculation unit that calculates a representative value for each image of the brightness image and the chrominance images having been generated by the first image generation unit, based upon pixel values indicated at pixels present within a first subject area containing a subject in the each image of the brightness image and the chrominance images;
   a second image generation unit that creates a differential image each in correspondence to the each image of the brightness image and the chrominance images having been generated by the first image generation unit, by subtracting the representative value calculated by the representative value calculation unit from pixel values indicated at pixels present within a second subject area containing the subject in the each image of the brightness image and the chrominance images;

a binarizing unit that creates a binary image by binarizing the differential image having been generated by the second image generation unit;

a synthesizing unit that creates a synthetic image by combining the binary image created by the binarizing unit in correspondence to the brightness image and the binary images created by the binarizing unit in correspondence to the chrominance images;

a mask extraction unit that extracts a mask constituted with a white pixel cluster from the synthetic image generated by the synthesizing unit;

an evaluation value calculation unit that calculates an evaluation value indicating a likelihood of the mask, having been extracted by the mask extraction unit, representing the subject; and a subject designating unit that designates the subject in the target image based upon the evaluation value having been calculated by the evaluation value calculation unit.

2. A subject designating device according to claim 1, further comprising:

a third image generation unit that weights each pixel value indicated at each pixel present in the differential image generated by the second image generation unit by multiplying the each pixel value by a coefficient determined in correspondence to a distance from a third subject area containing the subject in the differential image to the each pixel present in the differential image so as to generate a weighted differential image in correspondence to the each image of the brightness image and the chrominance images, wherein:

the binarizing unit binarizes the weighted differential image having been generated by the third image generation unit.

3. A subject designating device according to claim 1, wherein:

the representative value is any one of an average value, a most frequent value and a median of the pixel values indicated at the pixels present within the second subject area.

4. A subject designating device according to claim 2, wherein:

the representative value is any one of an average value, a most frequent value and a median of the pixel values indicated at the pixels present within the second subject area.

5. A subject designating device according to claim 1, wherein:

the second subject area is any one of an area containing a coordinate point on the target image indicated by a user and an area containing an AF point for focus adjustment processing.

6. A subject designating device according to claim 2, wherein:

the second subject area is any one of an area containing a coordinate point on the target image indicated by a user and an area containing an AF point for focus adjustment processing.

7. A subject designating device according to claim 3, wherein:

the second subject area is any one of an area containing a coordinate point on the target image indicated by a user and an area containing an AF point for focus adjustment processing.

8. A subject designating device according to claim 4, wherein:

the second subject area is any one of an area containing a coordinate point on the target image indicated by a user and an area containing an AF point for focus adjustment processing.

9. A subject tracking apparatus, comprising:

a subject designating device according to claim 1; and a tracking unit that tracks the subject designated by the subject designating unit from one frame to the next through a plurality of frames.

10. A subject tracking apparatus, comprising:

a subject designating device according to claim 2; and a tracking unit that tracks the subject designated by the subject designating unit from one frame to the next through a plurality of frames.

11. A subject tracking apparatus, comprising:

a subject designating device according to claim 3; and a tracking unit that tracks the subject designated by the subject designating unit from one frame to the next through a plurality of frames.

12. A subject tracking apparatus, comprising:

a subject designating device according to claim 4; and a tracking unit that tracks the subject designated by the subject designating unit from one frame to the next through a plurality of frames.

13. A subject tracking apparatus, comprising:

a subject designating device according to claim 5; and a tracking unit that tracks the subject designated by the subject designating unit from one frame to the next through a plurality of frames.

14. A subject tracking apparatus, comprising:

a subject designating device according to claim 6; and a tracking unit that tracks the subject designated by the subject designating unit from one frame to the next through a plurality of frames.

15. A subject tracking apparatus, comprising:

a subject designating device according to claim 7; and a tracking unit that tracks the subject designated by the subject designating unit from one frame to the next through a plurality of frames.

16. A subject tracking apparatus, comprising:

a subject designating device according to claim 8; and a tracking unit that tracks the subject designated by the subject designating unit from one frame to the next through a plurality of frames.

* * * * *